United States Patent [19]
Saggio et al.

[11] Patent Number: 5,950,964
[45] Date of Patent: Sep. 14, 1999

[54] CARGO GUIDE

[75] Inventors: Rosario S. Saggio, Arcadia; Karlton K. Okamoto, Lakewood; Isidor Lenoil, West Hills, all of Calif.

[73] Assignee: McDonnell Douglas Corporation, St. Louis, Mo.

[21] Appl. No.: 09/104,514

[22] Filed: Jun. 25, 1998

[51] Int. Cl.$^6$ ................................................. B64C 1/20
[52] U.S. Cl. ............................. 244/118.1; 244/118.2; 410/69; 410/70
[58] Field of Search ............................ 244/118.1, 118.2; 410/69, 70

[56] References Cited

U.S. PATENT DOCUMENTS

| | | | |
|---|---|---|---|
| 4,050,655 | 9/1977 | Bogue et al. | 244/137 R |
| 4,134,345 | 1/1979 | Baldwin et al. | 105/336 R |
| 4,203,372 | 5/1980 | Ivanov et al. | 410/67 |
| 4,234,278 | 11/1980 | Harshman et al. | 24/118.1 |
| 4,388,030 | 6/1983 | Skaale | 410/69 |
| 5,011,348 | 4/1991 | Jensen et al. | 410/79 |
| 5,098,038 | 3/1992 | Hruska et al. | 244/137.1 |
| 5,104,064 | 4/1992 | Kuitems | 244/118.1 |
| 5,265,991 | 11/1993 | Herrick et al. | 244/118.1 |
| 5,310,297 | 5/1994 | Benjamin | 244/118.1 |
| 5,316,242 | 5/1994 | Eilenstein-Wiegmann et al. | 244/137.1 |
| 5,346,161 | 9/1994 | Eilenstein-Wiegmann et al. | 244/137.1 |
| 5,356,250 | 10/1994 | Vogg et al. | 410/86 |
| 5,486,077 | 1/1996 | Nutting | 410/69 |
| 5,573,359 | 11/1996 | Moradians | 410/69 |
| 5,609,240 | 3/1997 | Moradians | 198/782 |

*Primary Examiner*—J. Woodrow Eldred
*Attorney, Agent, or Firm*—Alston & Bird LLP

[57] ABSTRACT

A device for guiding movement of cargo items during loading and unloading from a cargo compartment of an aircraft includes a housing defining a recessed well below an upper surface of the housing, a slider which slides within the recessed well, a pawl pivotally connected to the slider and pivotal from a stowed position in the well to a deployed position projecting above the upper surface of the housing, and compression springs connected to the slider for absorbing impact loads imposed on the pawl in the longitudinal direction along which the slider and pawl slide as a unit. The cargo-engaging end of the pawl includes chamfered surfaces which cause the pawl to be depressed down into the well when the pawl is subjected to transverse impacts.

13 Claims, 3 Drawing Sheets

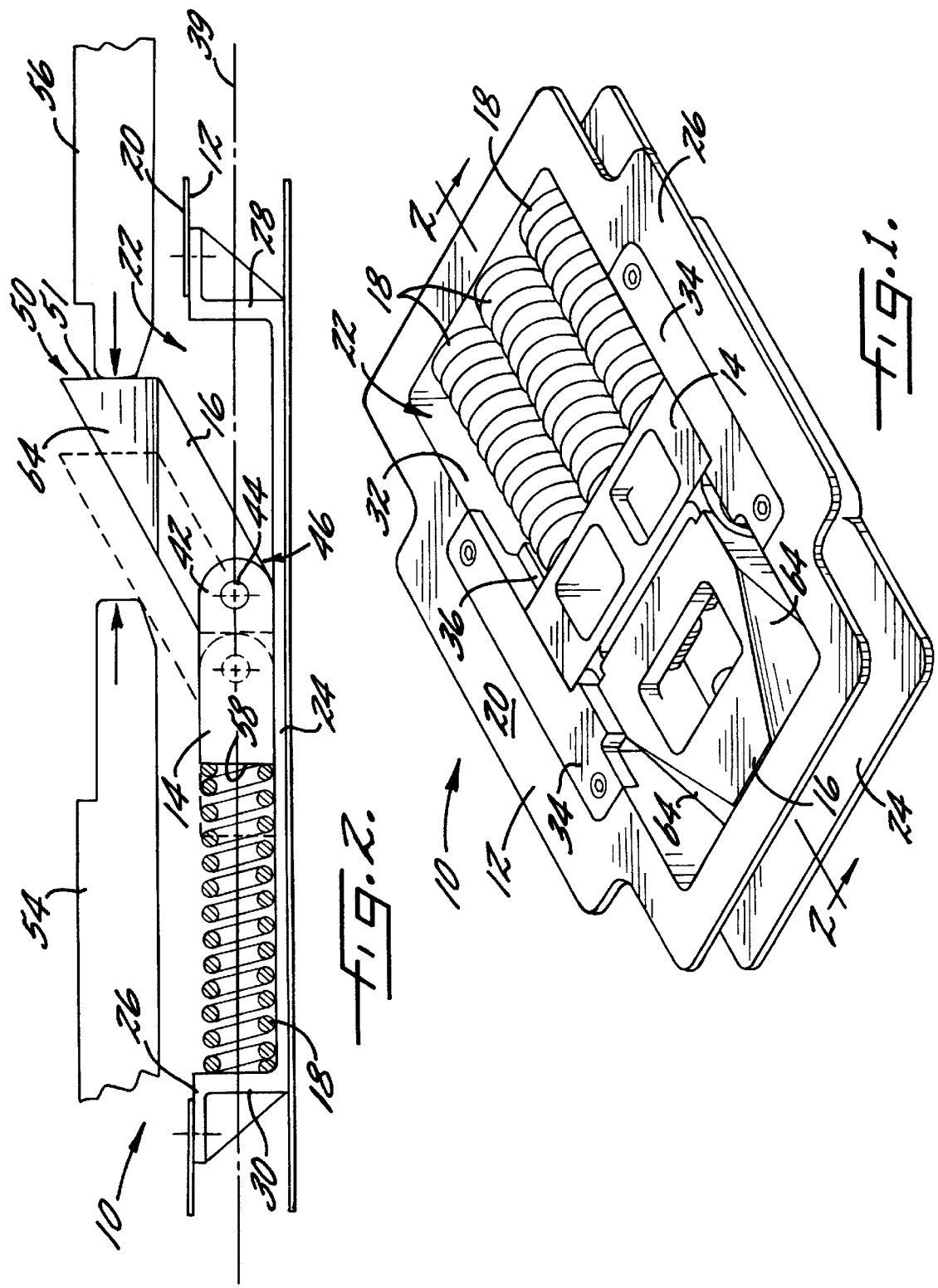

CARGO GUIDE

FIELD OF THE INVENTION

The present invention relates to a cargo guide which facilitates aligning an edge of an item of cargo with a predetermined point, such as a doorway jamb, on a cargo deck.

BACKGROUND OF THE INVENTION

Various latching devices are commonly employed within a cargo compartment of an aircraft for securing a pallet which supports a cargo container so that the pallet and container are restrained from moving about the cargo compartment during flight. A typical aircraft cargo compartment also includes cargo guides for use during loading and unloading of pallets and containers within the cargo compartment for aligning the pallets with a predetermined point on the cargo deck.

Cargo handling systems usually include rollers along which the cargo containers can be rolled to position them for removal through a doorway of the cargo compartment. One disadvantage of current commercially available cargo guides is that they are relatively weak and nonresilient, and can relatively easily be broken by impact loads exerted on them by a moving pallet which supports a heavy container. A further disadvantage of existing cargo latching and guiding systems is that often there are no suitable cargo guides for aligning a pallet with the cargo compartment doorway, and so operators frequently employ the latches as cargo guides for aligning the pallet. However, the latches tend to be readily broken or worn because they are not designed to withstand the types of impact loads exerted on them by the moving pallets.

SUMMARY OF THE INVENTION

The present invention provides a cargo guide which facilitates aligning an edge of an item of cargo with a predetermined point on a cargo deck, such as a doorway. The cargo guide also resiliently absorbs impact loads so that it is less susceptible to impact damage. Additionally, dynamic loads transmitted into the cargo deck are reduced.

In accordance with a preferred embodiment of the invention, the cargo guide includes a housing having an upper surface and defining a space or well which is recessed below the upper surface. The housing is adapted to be fixed in place on a cargo deck. The cargo guide also includes a slider positioned in the well and slidable therein along a longitudinal axis of the cargo guide. The guide further comprises a pawl having a fixed end and a free end, the fixed end being pivotally attached to the first end of the slider. The pawl is pivotable between a stowed position in which the pawl is substantially completely contained in the well below the upper surface of the housing and a deployed position in which the free end of the pawl projects above the upper surface. The free end of the pawl defines a cargo-engaging surface which in the deployed position of the pawl serves as a guide for an edge of an item of cargo. The cargo guide also includes one or more resilient members mounted in the well and connected to the second end of the slider for absorbing longitudinal impact loads imposed by an item of cargo on the pawl. Thus, when a cargo pallet is slid against the cargo-engaging end of the pawl, the slider and pawl slide within the housing in response to the impact load so as to compress the resilient members and thereby absorb some of the energy of the impact.

In a preferred embodiment of the invention, the free end of the pawl includes chamfered surfaces which face upward and away from the slider. The chamfered surfaces tend to cause the pawl to be depressed toward the stowed position when the pawl is impacted transversely, such as by a glancing impact of a moving pallet, so that damage from transverse impact loads is substantially eliminated.

Preferably, the cargo guide includes at least one torsion spring connected between the slider and the pawl for biasing the pawl toward the deployed position. Accordingly, the pawl tends to self-deploy in the absence of loads depressing the pawl into the housing.

The cargo guide preferably also includes a lock pin which engages the pawl and the housing for locking the pawl in the stowed position. Thus, the cargo guide can be stowed when not needed, such as during flight.

The cargo guide can be used in any application where it is desirable to be able to align the edge of an item of cargo with some predetermined point by sliding the item up against the cargo guide. The cargo guide is particularly advantageous when used as a doorway guide positioned with the cargo-engaging end of the pawl positioned just aft of a forward jamb of a cargo compartment doorway and slightly aft of the fore/aft cargo latches. In this position, the cargo guide protects the fore/aft latches from being damaged by the moving pallets during loading and unloading thereof. Thus, the cargo guide separates the hardware used for ground handling from the hardware used for flight such as fore/aft restraints.

BRIEF DESCRIPTION OF THE DRAWINGS

The above and other objects, features, and advantages of the invention will become more apparent from the following description of a preferred embodiment thereof, when taken in conjunction with the accompanying drawings, in which:

FIG. 1 is a perspective view of a cargo guide in accordance with a preferred embodiment of the invention, showing the pawl in the stowed position;

FIG. 2 is a cross-sectional view taken on line 2—2 of FIG. 1, but showing the pawl in the deployed position;

DETAILED DESCRIPTION OF THE DRAWINGS

The invention is now explained by reference to a preferred embodiment of a cargo guide in accordance with the invention. It should be understood, however, that the invention is not limited to the embodiment illustrated and described herein.

Figure 3:
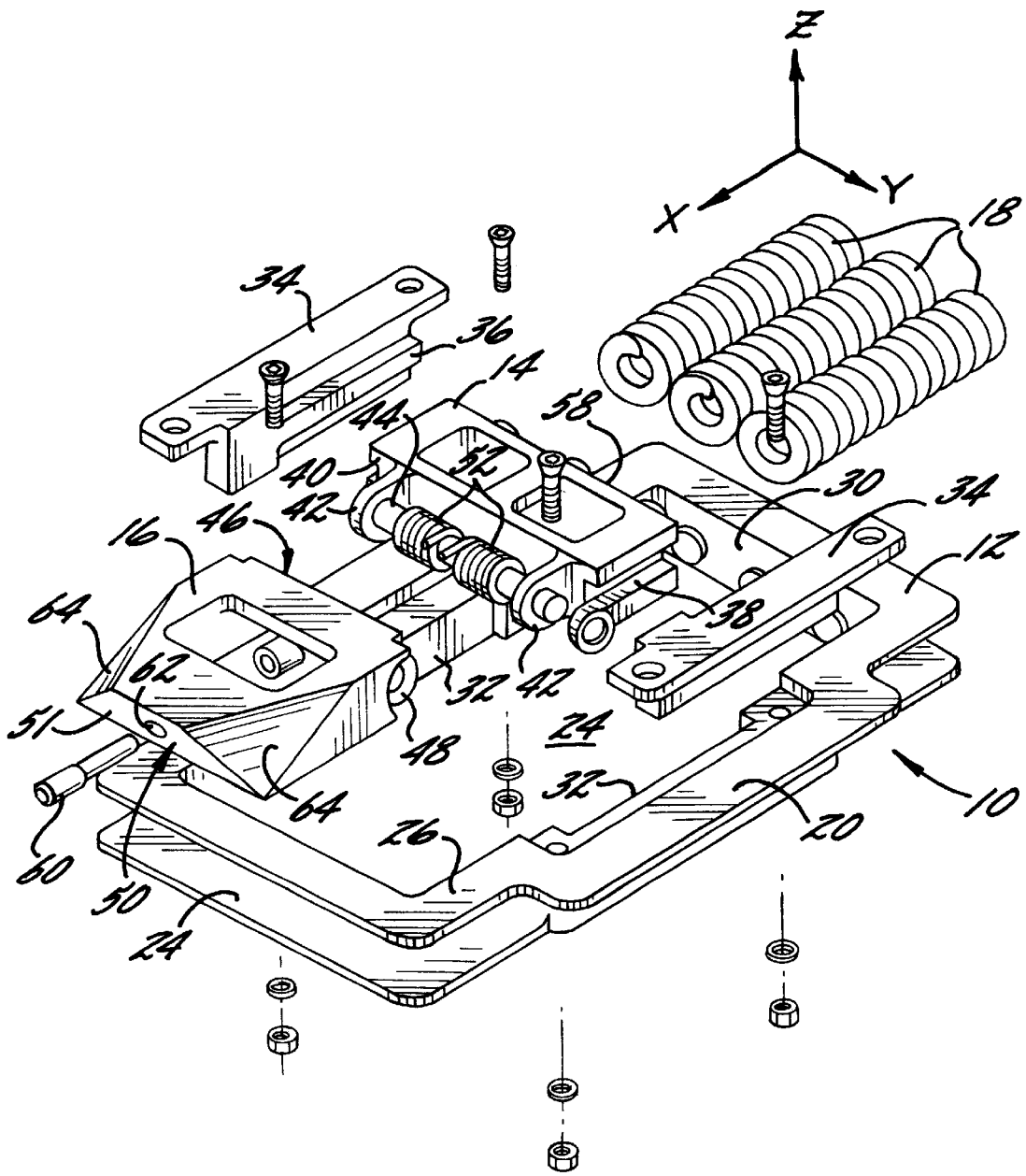
FIG. 3 is an exploded perspective view of the cargo guide.

FIGS. 1–3 depict a cargo guide 10 in accordance with a preferred embodiment of the invention. The guide 10 comprises a housing 12, a slider 14, a pawl 16, and a plurality of resilient members or springs 18. The housing 12 defines an upper surface 20 of the cargo guide, and includes a well 22 which is recessed below the upper surface 20. More particularly, the housing 12 comprises a bottom wall 24 which is generally planar, a top wall 26 which is generally planar and spaced above and parallel to the bottom wall, a front wall 28 and a rear wall 30 which are spaced apart and parallel and connected between the top and bottom walls, and a pair of opposite side walls 32 which are spaced apart and parallel to each other and perpendicular to the front and rear walls. Thus, the front wall 28, rear wall 30, and side walls 32 collectively define a generally rectangular well 22 within the housing 12. The housing also includes a pair of slider guides 34 which are mounted adjacent each of the side walls 32. Each of the slider guides includes a rail 36 (only one visible in FIGS. 1 and 3) which longitudinally extends parallel to the respective side wall. The top and bottom walls of the housing 12 extend outwardly beyond the front, rear, and side walls to facilitate bonding the cargo guide 10 into a honeycomb panel or "omni panel" of the type commonly employed in some aircraft cargo compartments.

The slider 14 comprises a generally rectangular block which is positioned within the well 22 in the housing. The slider 14 includes a groove 38 formed in each of its sides for engaging the adjacent rail 36. Thus, the slider 14 is slidable along the rails 36 in the direction of the longitudinal axis 39. The front end 40 of the slider 14 includes pin-mounting lugs 42 for mounting a pin 44 which extends transversely along the front end of the slider.

The pawl 16 comprises a generally polygonal block. The rear or fixed end 46 of the pawl includes pin-mounting lugs 48 through which the pin 44 extends, such that the pawl 16 is pivotally connected to the slider 14 by the pin 44. Thus, the slider 14 and pawl 16 slide as a unit within the well 22 of the housing 12, and the pawl 16 pivots about its pin connection to the slider 14. The pawl is sized so that it can be rotated down into the well 22 such that the pawl is substantially completed below the upper surface 20 of the housing, as shown in FIG. 1. This represents the stowed position of the pawl. The pawl 16 is pivotable into a deployed position as shown in FIG. 2. In the deployed position, the front or cargo-engaging end 50 of the pawl projects above the upper surface 20 of the housing. The cargo guide 10 includes torsion springs 52 connected between the slider 14 and the pawl 16 for biasing the pawl 16 toward the deployed position. With reference to FIG. 2, should a moving cargo item 54 impact the deployed pawl 16 in the longitudinal direction from the rear toward the front, or otherwise depress the pawl downwardly, the pawl will be depressed down into the recessed well 22 of the housing. When the force depressing the pawl is removed, the torsion springs 52 will automatically pivot the pawl 16 back to its deployed position.

On the other hand, should an item of cargo 56 impact the cargo-engaging end 50 of the pawl in a purely longitudinal front-to-rear direction, the cargo item 56 will impact on the cargo-engaging surface 51 which is generally normal to the longitudinal axis 39. Accordingly, the pawl 16 and slider 14 will be forced to slide as a unit within the well 22 toward the rear wall 30 of the housing, as shown in dotted line in FIG. 2. Consequently, the springs 18 will be compressed between the rear end 58 of the slider 14 and the rear wall 30 of the housing. Thus, some of the energy of the dynamic impact load is absorbed by the springs 18 so that the dynamic load transmitted into the structure supporting the guide 10, such as the cargo deck of an aircraft, is reduced.

The cargo guide 10 preferably also includes a lock pin 60 for locking the pawl 16 in the stowed position of FIG. 1. The lock pin 60 extends through a hole (not shown) in the front wall 28 of the housing and into a hole 62 in the cargo-engaging end 50 of the pawl.

The pawl 16 preferably includes chamfered surfaces 64 which face generally outward and upward. The chamfered surfaces 64 permit the pawl 16 to receive non-longitudinal or transverse (i.e., side-to-side) impacts without breaking. Specifically, the chamfered surfaces 64 cause the pawl 16 to be depressed down into the recessed well 22 of the housing when an item of cargo impacts either of the chamfered surfaces. Thus, the cargo guide 10 is able to tolerate glancing impacts without being damaged. Preferably, each of the chamfered surfaces is inclined in the Y-axis direction about 30–60°, and more preferably about 45°, with respect to the X-Y plane (FIG. 3), and is inclined in the X-axis direction about 20–50°, and more preferably about 27.5°, with respect to the X-Y plane, when the pawl 16 is in the deployed position of FIG. 2.

Figure 4:
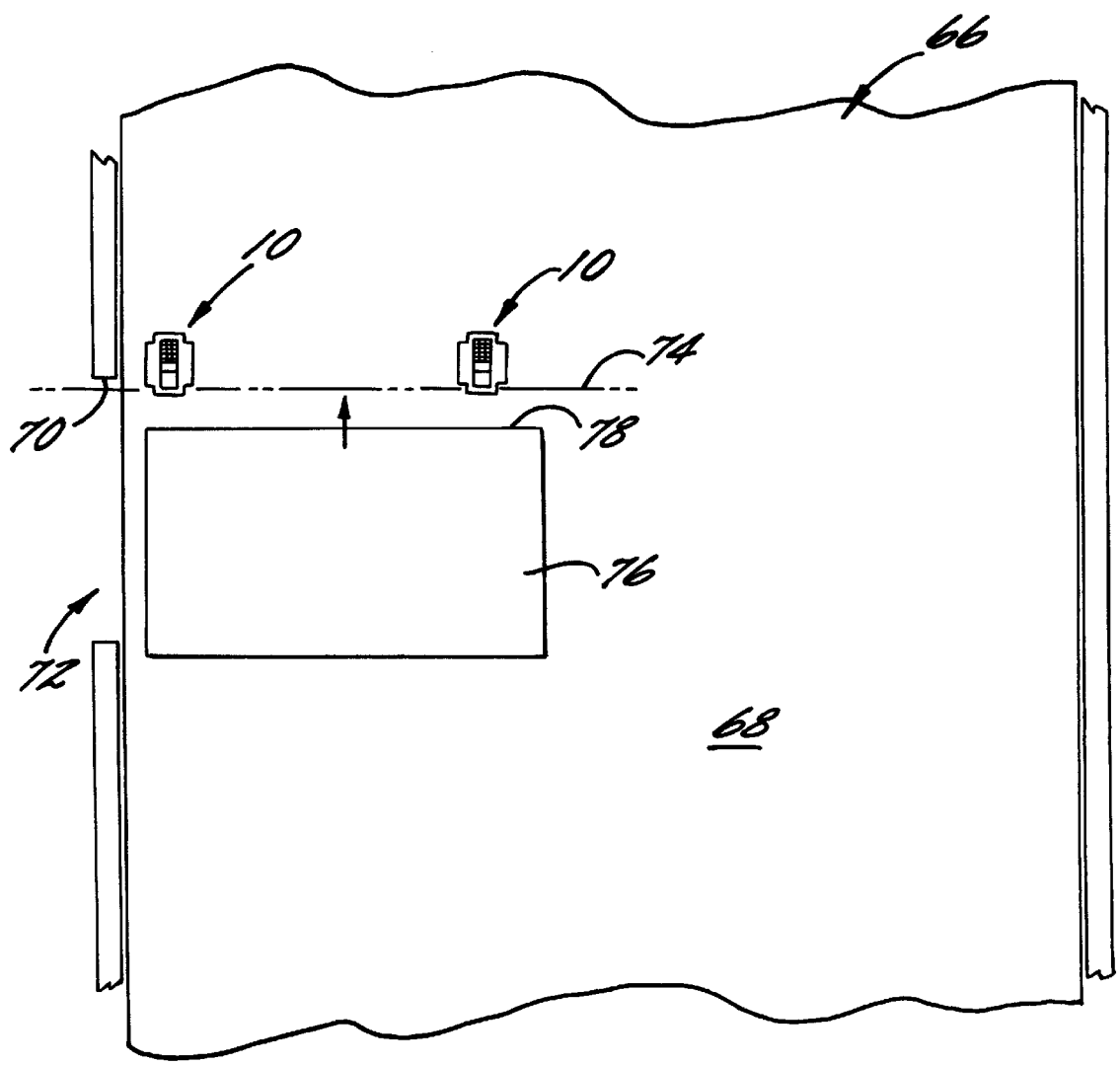
FIG. 4 is a schematic top elevational view of an aircraft cargo compartment, showing a plurality of cargo guides in accordance with the invention being used as doorway guides.

FIG. 4 depicts one application of the cargo guide 10 of the invention. A schematic top view of a cargo compartment 66 of an aircraft is shown, in which a pair of the cargo guides 10 are secured to the cargo deck 68 such that the cargo-engaging ends of the pawls are positioned just aft of the forward jamb 70 of the cargo compartment doorway 72. The cargo-engaging ends of the pawls are aligned in the transverse direction so that they collectively define a transverse line 74 which is slightly aft of the forward doorway jamb 70. Accordingly, a containerized or palletized item of cargo 76 may be rolled or slid in the forward direction as shown, until it impacts the pawls of the cargo guides 10. The springs of the guides 10 will be compressed initially, but as the cargo item's inertia is dissipated, the springs will tend to restore the pawls to their original positions. The forward edge 78 of the cargo item is thus positioned in contact with the pawls, thereby aligning the cargo item 76 with the doorway 72 such that the cargo item can be easily unloaded through the doorway without contacting and potentially damaging the doorway jambs.

The cargo guide 10 may be suitably sized and configured in accordance with the expected loads which must be tolerated. In the preferred embodiment of the invention, the springs 18 comprise coil springs collectively having a spring rate of about 2100 pounds per inch and a total travel (i.e., the difference between the spring length when the slider 14 is in the fully extended position and the spring length when fully compressed) of about one inch. The springs 18 advantageously are flat wound springs formed of elliptical wire.

While the invention has been explained by reference to a particular preferred embodiment thereof, it will be understood that this embodiment is but one of various forms and embodiments which the invention may take. Various modifications and/or substitutions of equivalents may be made without departing from the scope of the invention as set forth in the appended claims.

What is claimed is:

1. A cargo guide facilitating aligning an edge of an item of cargo with a predetermined point on a cargo deck, comprising:

a housing having an upper surface and defining a well which is recessed below the upper surface, the housing being adapted to be fixed in place on a cargo deck;

a slider positioned in the well and slidable therein along a longitudinal axis of the cargo guide, the slider having opposite first and second ends;

a pawl having a fixed end and a free end, the fixed end being pivotally attached to the first end of the slider, the pawl being pivotable between a stowed position in which the pawl is substantially completely contained in the well below the upper surface of the housing and a deployed position in which the free end of the pawl projects above the upper surface, the free end of the pawl having a cargo-engaging surface which serves as a guide for an edge of an item of cargo in the deployed position of the pawl; and a resilient member mounted in the well and connected to the second end of the slider for absorbing longitudinal impact loads imposed by an item of cargo on the pawl, the slider and pawl sliding within the housing in response to said impact loads so as to compress the resilient member and thereby absorb some of the energy of the impact.

2. The cargo guide of claim 1, wherein the free end of the pawl includes chamfered surfaces which face upward and outward, the chamfered surfaces tending to cause the pawl to be depressed toward the stowed position when the pawl is impacted transversely.

3. The cargo guide of claim 2, further comprising at least one torsion spring connected between the slider and the pawl for biasing the pawl toward the deployed position.

4. The cargo guide of claim 3, further comprising a lock pin which engages the pawl and the housing for locking the pawl in the stowed position.

5. The cargo guide of claim 2, wherein the resilient member comprises at least one compression spring.

6. The cargo guide of claim 5, wherein the cargo guide includes a plurality of compression springs collectively serving as the resilient member.

7. The cargo guide of claim 6, wherein the compression springs comprise coil springs.

8. A cargo guide facilitating aligning an edge of an item of cargo with a predetermined point on a cargo deck, comprising:

a housing having an upper surface and defining a well which is recessed below the upper surface, the housing being adapted to be fixed in place on a cargo deck;

a slider positioned in the well and slidable therein along a longitudinal axis of the cargo guide, the slider having opposite first and second ends;

a pawl having a fixed end and a free end, the fixed end being pivotally attached to the first end of the slider, the pawl being pivotable between a stowed position in which the pawl is substantially completely contained in the well below the upper surface of the housing and a deployed position in which the free end of the pawl projects above the upper surface, the free end of the pawl having a cargo-engaging surface which is generally normal to the longitudinal axis and chamfered surfaces on opposite sides of the cargo-engaging surface which face upward and outward, the chamfered surfaces tending to cause the pawl to be depressed toward the stowed position when the pawl is impacted tranversely; and a resilient member mounted in the well and connected to the second end of the slider for absorbing longitudinal impact loads imposed by an item of cargo on the pawl, the slider and pawl sliding within the housing in response to said impact loads so as to compress the resilient member and thereby absorb some of the energy of the impact.

9. The cargo guide of claim 8, further comprising at least one torsion spring connected between the slider and the pawl for biasing the pawl toward the deployed position.

10. The cargo guide of claim 9, further comprising a lock pin which engages the pawl and the housing for locking the pawl in the stowed position.

11. The cargo guide of claim 8, wherein the resilient member comprises at least one compression spring.

12. The cargo guide of claim 11, wherein the cargo guide includes a plurality of compression springs collectively serving as the resilient member.

13. The cargo guide of claim 12, wherein the compression springs comprise coil springs.

* * * * *